(12) United States Patent
Kanter

(10) Patent No.: US 10,989,599 B2
(45) Date of Patent: Apr. 27, 2021

(54) SYSTEM AND METHOD FOR SPECTRAL FILTERING OF OPTICAL SIGNALS

(71) Applicant: Gregory S. Kanter, Chicago, IL (US)

(72) Inventor: Gregory S. Kanter, Chicago, IL (US)

(73) Assignee: Nucript LLC, Evanston, IL (US)

( * ) Notice: Subject to any disclaimer, the term of this patent is extended or adjusted under 35 U.S.C. 154(b) by 294 days.

(21) Appl. No.: 16/275,623

(22) Filed: Feb. 14, 2019

(65) Prior Publication Data
US 2019/0250039 A1  Aug. 15, 2019

Related U.S. Application Data

(60) Provisional application No. 62/630,917, filed on Feb. 15, 2018.

(51) Int. Cl.
| | | |
|---|---|---|
| *G02B 5/28* | (2006.01) | |
| *G01J 3/45* | (2006.01) | |
| *G02B 5/20* | (2006.01) | |
| *G01B 9/02* | (2006.01) | |
| *G02B 27/10* | (2006.01) | |
| *G02B 6/00* | (2006.01) | |
| *G01J 3/12* | (2006.01) | |

(52) U.S. Cl.
CPC ............... *G01J 3/45* (2013.01); *G01B 9/02* (2013.01); *G02B 5/20* (2013.01); *G02B 5/28* (2013.01); *G02B 6/00* (2013.01); *G02B 27/10* (2013.01); *G01J 2003/1226* (2013.01)

(58) Field of Classification Search
CPC ...... G01J 3/45; G01J 2003/1226; G02B 5/28; G02B 6/00; G02B 27/10; G01B 9/02; H01S 3/06754; H01S 3/302
See application file for complete search history.

(56) References Cited

U.S. PATENT DOCUMENTS

| | | | | |
|---|---|---|---|---|
| 4,887,884 | A * | 12/1989 | Hayden | .............. G02F 1/065 385/1 |
| 6,067,180 | A * | 5/2000 | Roberts | ............ H04B 10/25133 398/1 |
| 6,321,000 | B1 * | 11/2001 | King | .............. G02B 6/12007 359/333 |

(Continued)

*Primary Examiner* — Wen Huang
*Assistant Examiner* — Matthew Y Lee
(74) *Attorney, Agent, or Firm* — Nadya Reingand; Yan Hankin

(57) ABSTRACT

A method for spectral filtering an input optical signal is described. The filtering system uses Brillouin gain inside an interferometer. The interferometer is biased to null signals that propagate without Brillouin gain, but due to asymmetric levels of gain in the interferometer arms the interference null is disturbed for signals of an optical frequency that experience Brillouin gain. The filter thereby preferentially passes signal frequencies that are inside the Brillouin gain bandwidth creating a high extinction ratio filter. The narrow bandwidth of the Brillouin gain effect can allow for spectrally narrow filters such as 30 MHz. The filter can be realized in a stable Sagnac loop configuration even if the pump and signal are combined prior to the Sagnac loop by using a power control device such as an attenuator placed asymmetrically inside the loop. The filter can achieve net gain and can be designed to have a tunable bandwidth.

20 Claims, 10 Drawing Sheets

(56) References Cited

U.S. PATENT DOCUMENTS

| | | | | |
|---|---|---|---|---|
| 6,356,384 B1* | 3/2002 | Islam | ................ | H01S 3/302 |
| | | | | 359/334 |
| 2003/0086638 A1* | 5/2003 | Frolov | ............ | G02B 6/29335 |
| | | | | 385/17 |

* cited by examiner

SYSTEM AND METHOD FOR SPECTRAL FILTERING OF OPTICAL SIGNALS

CROSS-REFERENCE TO RELATED APPLICATIONS

The current patent application claims priority to U.S. provisional application No. 62/630,917 filed Feb. 15, 2018.

FIELD OF THE INVENTION

The field of the invention is optical signal processing, particularly the spectral filtering of an input optical signal as is commonly used in sensing and communications applications, including microwave photonics.

BACKGROUND

It is often useful in optical applications such as optical communication, microwave photonics, and optical sensing to spectrally filter an incoming optical signal thus isolating the desired signal from undesired noise as well as other interfering signals. There are many types of optical filters in common use including thin film filters often used for add/drop multiplexers (ADMs) in optical communication networks, Fabry-Perot filters, and Fiber Bragg Grating filters. Such filters are widely used.

One filter with some unusual properties is a filter based on Brillouin Gain (BG). Brillouin gain is a nonlinear process where an input pump of optical frequency $f_p$ produces gain in a narrow band of frequencies $\Delta f_s$ centered around a signal optical frequency of $f_s = f_p - f_B$ where $f_B$ is the BG frequency shift. For a pump of a stable optical frequency that varies much less than the BG bandwidth associated with the nonlinear BG medium or $\delta f_B$, the signal passband $\Delta f_s \sim \delta f_B$. Generally $\delta f_B \ll f_B$, for instance in typical Silica optical fibers $f_B \sim 11$ GHz and $\delta f_B \sim 30$ MHz. One interesting property of BG is thus the narrow gain bandwidth achievable allowing for very narrow optical filters. Additionally, the optical frequency of the pump can be varied thus allowing for a tunable filter passband (both $f_s$ and $\Delta f_s$ being tunable). If the pump frequency is tuned slowly, that is changed on a time scale slower than the propagation time through the nonlinear medium or $\tau_m$, then the center pass-band frequency $f_s$ changes in proportion to the pump frequency. Pump tuning that occurs faster than the propagation time through the nonlinear medium can change $\Delta f_s$, where a BG optical filter with an optical bandwidth $\Delta f_s > \delta f_B$ can be designed if pump optical bandwidth is $>\delta f_B$ (measured on a time scale of $\tau_m$). Another interesting property of BG is the potential for signal gain, as opposed to the more typical case where signal power is attenuated after propagating through a filter.

A BG filter can be constructed similar to FIG. 1 as is known in the art. Here an input optical signal to be filtered propagates through a first optical circulator 100 into a nonlinear medium 102 such as optical fiber. The optical circulator is a non-reciprocal device that permits light to travel from an input port to a common port in one direction, but sends light entering the circulator at the common port to a reflection port thereby separating light traveling in opposite directions. A higher power pump is injected into the nonlinear medium in the backward direction (backwards with respect to the input optical signal) using a second optical circulator 104. The backward propagating pump creates gain for the counter-propagating signal inside the BG bandwidth, but has minimal impact on the signal well outside the BG bandwidth. If the peak signal power gain is G (in dB), then the extinction ratio (ER) of the signal, defined as the ratio of the transmissivity of a signal at the optical frequency gain peak to the transmissivity of a signal that is well outside the gain bandwidth (e.g. $f_p - f_B - \Delta f_B$) is thus G. We see that to achieve a high ER, an important metric for a filter, a BG filter also needs high gain.

FIG. 2A shows a depiction of a potential input signal spectral profile 106, FIG. 2B the pump spectral profile 108, and FIG. 2C the corresponding filtered signal spectral profile 110. Note optical wavelength $\lambda$ and optical frequency $f$ are related as $f = n \cdot c / \lambda$ where n is the index of refraction of the material and c is the speed of light in vacuum. A narrow band of the signal sees gain and the rest is passed with unity gain The requirement of high gain in a high ER BG based filter is a deterrent to its use. This is in part because although high BG is possible, BG tends to saturate quickly, where saturation indicates that the transmissivity through the filter is input signal power dependent. Saturated signals are undesirable in many cases such as sensing applications where the intensity of the signal carries important information. Assume we want 30 dB of ER and thus 30 dB of gain. The amplified output signal power cannot exceed the input pump power, so clearly the input signal must be less than 30 dB smaller than the pump in order to avoid saturation, with 40 dB a safer number. If a 10 dBm input pump power is used then the input signal power should thus be <-30 dBm. The minimum input signal is determined by noise issues and is roughly constant for all high gain conditions (e.g. >10 dB gain). Saturation thus limits the tolerable dynamic range of the input signal, where dynamic range is defined as the ratio of the smallest tolerable input signal to the largest tolerable input signal where the smallest signal is determined by noise considerations and the largest signal is determined by linearity considerations. Another reason to avoid the need for high gains is to reduce the required pump power and to reduce unwanted pump scattering that occurs when the pump power gets too high.

BG is usually associated with high noise figure (adding excess noise to the signal). A typical optical amplifier (OA), like an Erbium doped fiber amplifier (EDFA), has a much lower noise figure. Placing a low noise amplifier before a higher noise amplifier can improve the net noise figure, as is known in the art. However, since BG already requires high gain to achieve a high ER filter, it can be difficult to pre-amplify the input optical signal in an OA before the BG as this leads to an inconvenient amount of gain.

What is needed is an optical filter that can use Brillouin gain to achieve some or all of the desired BG characteristics such as signal gain, narrow gain bandwidth, controllable gain bandwidth, and high extinction ratio, while also not requiring high levels of BG (e.g. BG<ER). The low required gain helps to reduce saturation problems and can in some cases reduce the required pump power or the amount of nonlinear material required in the filter. It is desirable if the pump wavelength can be tuned over a broad range larger than the Brillouin gain frequency shift so that the filter pass-band can also be accordingly tuned over a large range. It is desirable that the optical filter has a low noise figure. These benefits should be realized with minimal drawbacks.

SUMMARY

We describe an optical filter that uses Brillouin gain (BG) inside an interferometer (IN). The BG-IN filter is configured so that the interferometer output port nulls input optical frequencies sent to the interferometer input port about a large rejection bandwidth, except for a narrow band of frequencies that undergoes nonlinear BG. That is, input optical frequencies that propagate linearly through the IN (i.e. no BG) are at an interference null at the IN output. The BG occurs in one or both arms of the interferometer, but the gain level in the two arms is asymmetric thereby disturbing the interference null and preferentially passing signals that are within the BG bandwidth.

In one embodiment, the interferometer is a Sagnac Loop Interferometer (SLI). The input optical signal is split into two arms by an optical splitter where each arm travels around the Sagnac Loop in one of two propagation directions, sometimes called the clock-wise (CW) and counter clock-wise (CCW) directions and both propagation directions propagate through the same physical path. The signal propagates through a nonlinear Brillouin gain material, which can be realized by a nonlinear optical fiber, in two different directions. A means of asymmetrically injecting pump power to the Brillouin gain material causes the Brillouin gain to be higher in one direction then the other, thus achieving the desired disturbance of the interference null. The pump power can be set to be asymmetric by inserting an optical power control device such as an optical attenuator of transmissivity $T_{dB}$, optimally with insertion loss in the range of (1-10) dB with 4 dB being a typical level, such that the attenuation is before the nonlinear gain material when propagating in one direction around the loop and after the nonlinear gain material when propagating in the other direction around the loop. We will refer to the two propagation directions as the high gain direction, which is the propagation direction for which the signal sees higher Brillouin Gain, and the low gain direction for which the signal sees lower Brillouin Gain. The high and low gain arms are interferometrically combined in a combiner which is the same physical device as the optical splitter that created the CW and CCW paths.

The pump and signal can be combined in a pump-signal combiner before the SLI, where the combiner can be a broad-band combiner such as an 80/20 fused fiber coupler. The signal can enter the combiner on the 80% port so that it experiences only a small loss (80% transmissivity) which helps to maintain a good noise figure, while the pump experiences a larger loss (20% transmissivity). A broad-band splitter permits the pump and signal to be tuned over a range $>f_B$, for instance over a THz range, allowing pump and signal frequencies to be changed over a broad spectrum. While it is in general undesirable for the pump to experience loss it is not always of significant importance if enough pump power is available. Alternatively a different splitting ratio like 50/50 can be used which has more signal loss but transmits more of the pump power. The pump wavelength sets the filter passband (signal optical frequency $f_s$ that preferentially passes through the optical filter or equivalently the signal wavelength that has the highest net gain). Changing the pump wavelength can thus change the filter passband.

A frequency selective combiner such as an add-drop multiplexer (ADM) can also be used as a pump-and-signal combiner, which can have low insertion loss at both the signal and pump optical frequency but would also constrict the tuning range over which the optical frequencies can continuously be tuned. Since such a frequency selective combiner would combine a pump at frequency $f_p$, and a signal at frequency $f_s$ where $f_p-f_s=f_B$, where $f_B$ is the Brillouin gain frequency shift, a fixed ADM would only allow for continuous tuning of the pump frequency over a range $<f_B$, for instance $\pm 0.25 \cdot f_B$. The use of a broadband coupler lifts this restriction allowing for the tuning range of the pump to be $>f_B$.

If the pump frequency is changed on a time scale faster than the propagation time through the nonlinear medium ($\tau_m$) then the pump bandwidth is expanded when measured over a time of $\tau_m$. Changing the pump bandwidth in this way to a value $>\delta f_B$ can expand the optical filter bandwidth such that $\Delta f_s > \delta f_B$. Control over the filter center frequency and the filter bandwidth is therefore achievable.

The high gain propagation direction sees a gain $G_H$ and the low gain propagation direction sees a gain $G_L$ where $G_H > G_L$. The interference null seen by a signal that linearly propagates through the loop without a substantial Brillouin gain interaction, which would occur either if the pump is turned off or for signals that are well outside the Brillouin-induced gain bandwidth $\Delta f_B$ such as at frequencies of $f_s \pm f_B$, implies that linearly propagating signals (signals that do not experience Brillouin gain) will see low transmissivity through the loop. In other words, such frequencies will be filtered out. However signals of a frequencies that do experience the nonlinear Brillouin-induced gain (signal frequencies inside the Brillouin gain bandwidth) will see different amounts of gain in the two loop directions thus disturbing the interference null. Using the invention the extinction ratio between an input signal frequency that is inside the BG bandwidth and an input signal frequency that is outside the BG bandwidth can be greater than $G_H$.

Placing an optical amplifier before the interferometer, to either amplify the signal alone or the combined signal and pump frequencies, can be used to reduce the noise figure of the BG IN filter, while the filter suppresses the unwanted broad-band noise emission that is produced by the amplifier.

The pump polarization can be varied on a time scale fast with respect to $\tau_m$ in order to make the system polarization insensitive. Alternatively the pump and signal could be combined in identical polarization, such as if the combiner is a polarization maintaining (PM) combiner. The Sagnac Loop configuration ensures that if the pump and signal are the same polarization at the input to the SLI then the signal polarization will see maximum gain. Alternatively a polarizer can be inserted after the pump-signal combiner and before the SLI. The signal and pump polarizations can be set to maximally pass through the polarizer thereby fixing their polarizations to be the same at the SLI input port.

In another embodiment, the interferometer has two physically separate paths such as a Mach-Zehnder Interferometer (MZI). In this case the pump can be injected backward to the signal in just one arm of the interferometer. This improves the pump power efficiency since none of the pump power is wasted by providing unwanted gain to the other interferometer arm. It does create an issue of interferometric stability since the MZI is often not inherently phase stable, especially long interferometers as would be realized when using optical fiber. A locking signal can be passed through the MZI to allow for the MZI internal phase to be measured and actively stabilized. In this way the input optical signal to be filtered does not need to be of a specified power level, or even present at all, in order to keep the MZI locked.

In another embodiment the pump and signal frequencies sent to the interferometer are derived from the same master optical signal. The master optical signal could be a laser. The master optical signal is modulated, for instance by passing it through one or more modulators that can be electro-optical modulators, in order to generate a signal and pump frequency that differ by $f_b$, the filtering system then passing the desired signal frequency and rejecting all other signals derived from the master optical signal.

DETAILED DESCRIPTION

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments. In general, features described in one embodiment might be suitable for use in other embodiments as would be apparent to those skilled in the art. The term "optical wavelength" which is used in the current application is considered to be from 0.15 micron to 15 microns.

Figure 1:
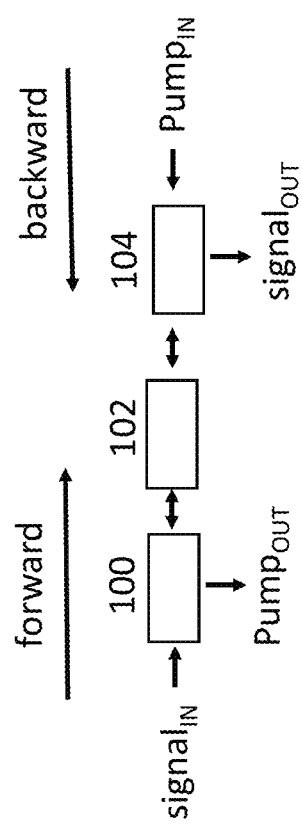
FIG. 1 Traditional BG filter (Prior art).
Figures 2A, 2B, 2C:
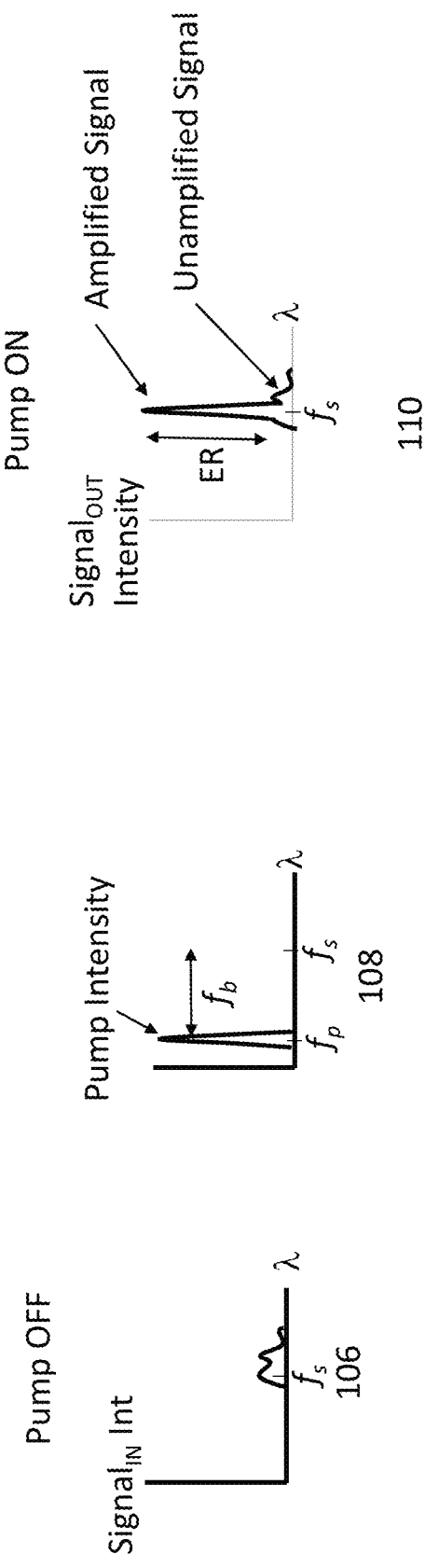
FIG. 2A Example input optical signal spectral profile. The y-axis is intensity.
FIG. 2B Example pump optical signal spectral profile. The y-axis is intensity.
FIG. 2C Example spectral profile of the filtered signal using the signal and pump from FIG. 2A and FIG. 2B in a traditional BG filter such as that shown in FIG. 1 (Prior art).
Figure 3:
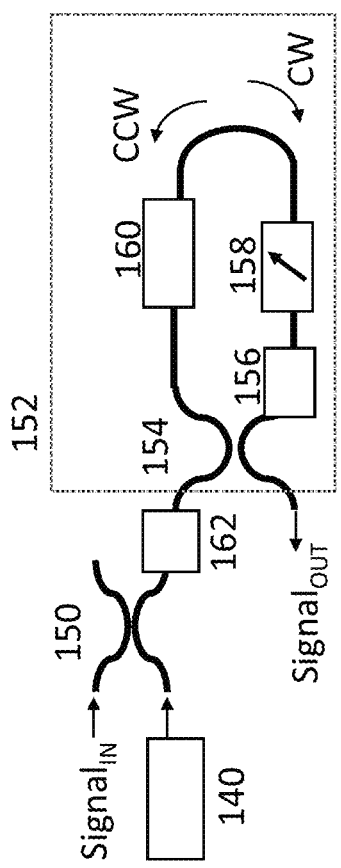
FIG. 3 BG-IN filter in a Sagnac loop configuration.

An embodiment of the invention is shown in FIG. 3. An input signal is combined with a pump laser 140 at an optical frequency of $f_p$ in a combiner 150, such as a broad band 50/50 splitter. The combined signal and pump are optionally amplified in an optical amplifier 162. After amplification the combined pump and signal enter a SLI 152. The SLI is a loop consisting of a 50/50 coupler 154, a nonlinear element such as a 1 km optical fiber 160, a polarization control device 156 which can be a fiber polarization controller or a suitable oriented half-wave plate, and a power control device 158 such as an optical attenuator. The pump and signal are split so that ½ their power propagates clockwise through the loop and ½ their power propagates counter-clockwise. The polarization control device is configured so that the output signal from the SLI is at an interference null such that when the pump is not injected all the signal is reflected back to the source and ideally none of it exits the SLI (SLI is a loop mirror). Note that the SLI can be reconfigured by adjusting the polarization control device so that the SLI maximally transmits a linearly propagating input signal, in which case the interference null occurs on the reflection port (reflected from the Input port) which can be accessed with an optical circulator. The reflection port then becomes the output port of the filter. Such a Sagnac Loop configuration is known in the art and is incorporated in the invention, though for simplicity we will assume a signal null after the transmission through the SLI.

The interference null is ideally perfect since the amount of signal power propagating in the clockwise and counter-clockwise directions is equal (assuming the use of a 50/50 coupler as the SLI splitter-and-combiner) and thus perfect cancellation is in principle achievable. The broad-band amplified spontaneous emission noise from the optical amplifier is thus well suppressed by the SLI. The power control device in the SLI can also be a gain element provided the gain is bidirectional to allow propagation around the loop, however in this case the broadband noise from the amplifier is not well filtered by the SLI.

The clockwise propagating signal that is at an optical frequency of $f_s=f_p-f_B$ will see gain that depends on the counter-clockwise propagating pump power that enters the nonlinear medium, and the counter-clockwise propagating signal will see gain that depends on the clockwise propagating pump power that enters the nonlinear medium. The counter-clockwise propagating pump power entering the nonlinear medium is smaller than the clockwise propagating pump power entering the nonlinear medium due to the location of the optical attenuator, which is before the nonlinear medium in one direction of propagation and after it in the other direction of propagation. Thus the counter-clockwise propagating signal will see higher BG than the clockwise propagating signal. This disrupts the interference null and allows the signal that is within the Brillouin gain bandwidth to leak through to the output port, while signal frequencies that are well outside the Brillouin gain bandwidth still are held at an interference null thus achieving a high extinction ratio. The inherently stable Sagnac configuration does not require phase stabilization to maintain the interference null.

Figures 4A, 4B:
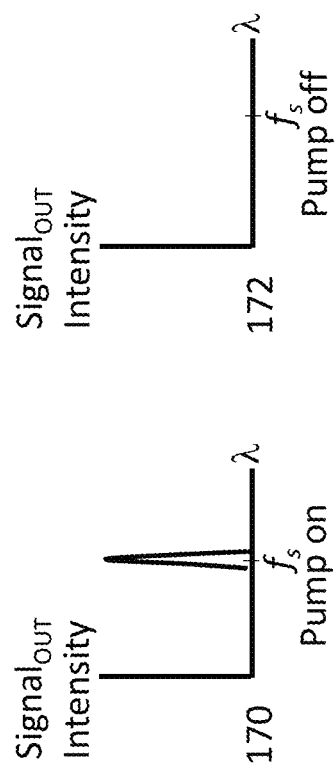
FIG. 4A Example spectral transfer function of a BG-IN filter with the pump on (all wavelengths but those near $f_s$ are suppressed).
FIG. 4B Example spectral transfer function of a BG-IN filter if the pump is off (all wavelengths are strongly suppressed).

FIG. 4A depicts the signal spectral transfer function with the pump on 170 and FIG. 4B depicts the signal spectral transfer function with the pump off 172. If the pump is off then input signals linearly propagate through the SLI thus the input signal is heavily attenuated (including any broadband light generated in the optical amplifier) while if the pump is on then a narrow passband is transmitted (usually with gain).

The pump and signal combiner can also be a wavelength dependent combiner such as an ADM. Such a design will reduce losses but it will be more difficult to change the filter passband by simply changing the pump wavelength since the ADM in inherently wavelength sensitive. That is, for a fixed (not tunable) ADM to combine with low loss both a fixed pump and signal optical frequency that have a frequency separation of $f_b$, the pump optical frequency cannot then be tuned towards the original signal frequency by more than a fraction of $f_b$, (e.g. $f_b/4$) since the pump input on the ADM must have high loss near the original signal frequency. This tightly constrains the continuous tuning range.

The linear transmissivity through the filter can be estimated by adding (in dB units) the natural ER of the Sagnac loop of $ER_{loop}$, which is limited by imperfect components such as imperfect 50/50 splitting of the splitter that defines the loop or imperfect polarization compensation so that the two propagation directions around the loop do not perfectly interfere, and the linear propagation loss around the loop which is usually dominated by the attenuator transmissivity $T_{dB}$. Note that the attenuator transmissivity is negative in dB units (representing loss) and the attenuator insertion loss is by convention $-T_{dB}$. When the pump is off the net transmissivity is $T_{net,dB}=-ER_{loop}+T_{dB}$. For example for a typical $ER_{loop}=27$ dB and a typical $T_{dB}=-3$ dB we have $T_{net,dB}=-30$ dB. That is, when the pump is on then input signals of a frequency well outside the BG bandwidth, for instance at $f_s+f_b$, will be attenuated by the SLI by 30 dB. When the pump is off then input signals at $f_s$ will also be attenuated by 30 dB.

When the pump is on and the signal is at the maximum Brillouin gain frequency then we can estimate the performance by neglecting phase effects of Brillouin gain and only relying on the Brillouin gain being exponentially dependent on the pump power that back-propagates with respect to the signal, that is $G_L=G_H^T$ where T is the transmission of the attenuator in linear units, we can then estimate that the net signal transmittance through the loop is $T_{net}=(T/4)\cdot[G_H+G_H^T-2\cdot(G_H^{(T+1)})^{0.5}]$. For a reasonable attenuator of 3 dB (T=0.5) and $G_H=14$ dB we estimate that $T_{net}=1$ making the filter lossless for a signal at the peak Brillouin gain frequency. If $G_H$ is increased to >14 dB then the filter will have net gain at $f_s$.

However, for a signal well outside the Brillouin gain frequency, such as a signal at $f_s+f_B$, the signal is in the linear transmission range where $T_{net,dB}\sim-30$ dB. Thus, although the highest gain the signal ever experiences is 14 dB the net ER is 30 dB. The invention is thus able to achieve an ER greater that the maximum Brillouin gain. Higher pump powers would lead to signal gain, even in the absence of an optical amplifier before the filter.

Figure 5:
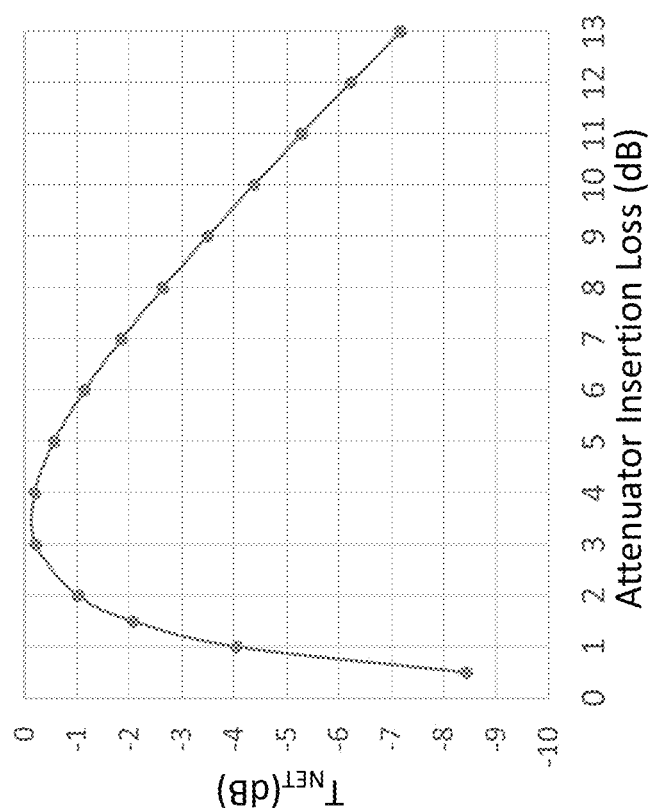
FIG. 5 Plot of expected filter transmission of a BG-SLI as a function of the attenuator value for $G_H$=14 dB and a 3 dB attenuator FIG. 6 Plot of filter ER as a function of net transmission for various levels of attenuation.
Figure 6:
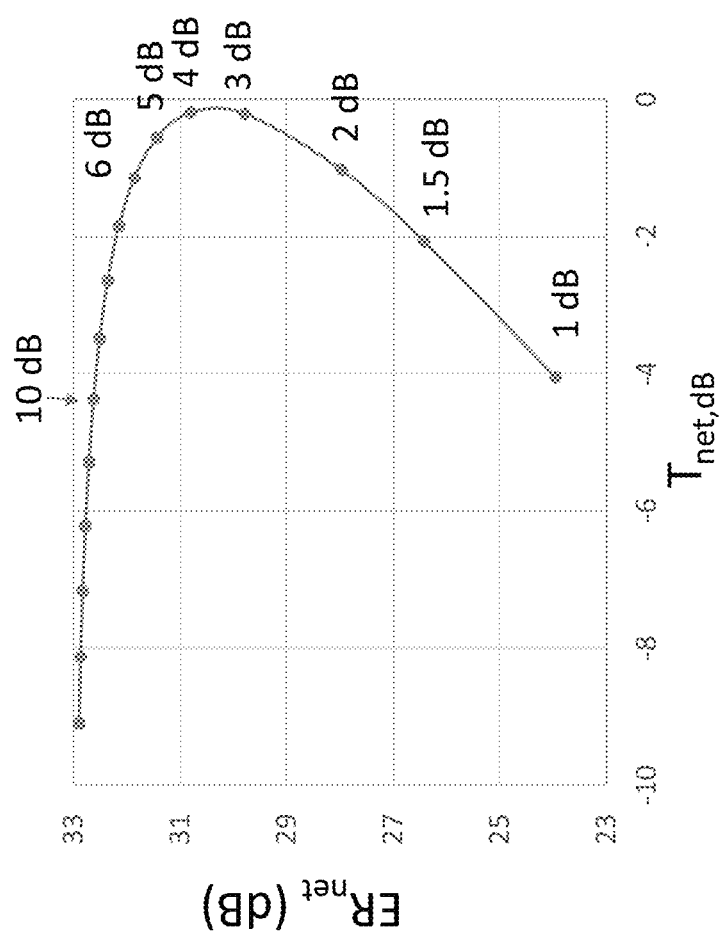

FIG. 5 plots the $T_{net}=(T/4)\cdot[G_H+G_H^T-2\cdot(G_H^{(T+1)})^{0.5}]$ function for a constant pump power as a function of the attenuator insertion loss. $G_H$ is set to 14 dB. When T=−3 dB we find $T_{NET}=1$ leading to a lossless filter. Choosing T=−5 dB reduces the net transmittance for a signal at the maximum Brillouin gain frequency by about 0.5 dB (with respect to the choice of T=−3 dB), but it will reduce the net transmittance in the linear regime by 5−3=2 dB. Thus the ER will be 1.5 dB better for a 5 dB attenuator, but at the expense of 0.5 dB insertion loss. This effect is highlighted in FIG. 6 where the net ER is plotted as a function of $T_{net}$ assuming that $ER_{loop}=27$ dB. The attenuation value used is stepped in 1 dB increments with several values listed next to their respective data points. Higher attenuation does lead to higher ER, but for attenuations above 4 dB this is at the expense of loss. Typical optimal attenuation values are {3-5} dB, but {1-10} dB are in a reasonable range to maintain both high ER and low net loss.

Figure 7:
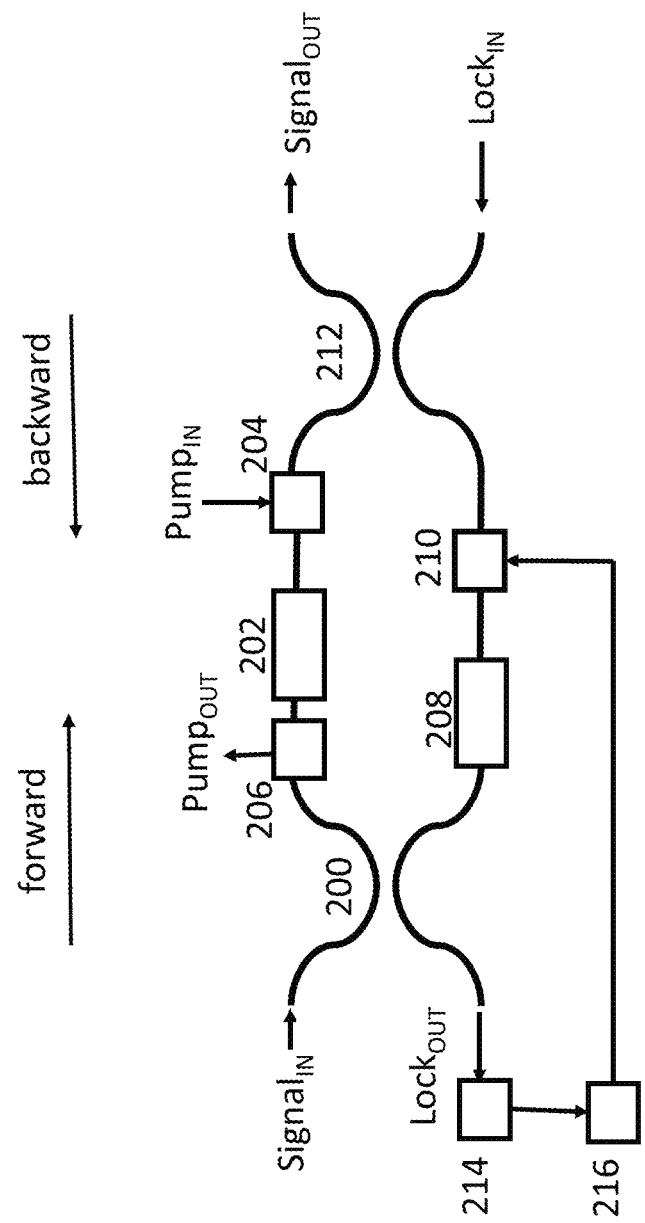
FIG. 7 BG-IN filter in a MZI configuration.

FIG. 7 shows an alternate embodiment of the invention in an MZI configuration. Here an input optical signal enters a first optical splitter 200 that can be a 50/50 coupler. The top arm of the MZI is the high gain arm and the bottom arm is the low gain arm, although gain is only experienced for a signal inside the BG bandwidth. A pump is sent to back-propagate through a nonlinear fiber 202 by injecting it into an optical circulator 204. The pump is removed by a second optical circulator 206. In this way the signal propagating through the high gain arm will interact with the pump if the signal is within the BG bandwidth. The low gain (bottom) arm contains a matching length of fiber 208 that matches the overall path lengths in the high and low gain arms. This path-matching allows the filtered output signal to be nulled over a wide range of input frequencies (a mis-matched path length in the interferometer leads to a frequency-dependent transmission).

A phase shifter 210 is used to adjust the interferometric phase shift between the high and low gain arms so that a signal outside the gain bandwidth will interfere destructively after the output coupler 212 which can be another 50/50 coupler. Polarization control is not shown although it is assumed that the polarization of the signal in the high and low gain arms are matched at the output coupler for maximum interference. A locking signal of a known wavelength is injected through the MZI (in the figure it is injected in the backward direction to the signal propagation direction although it can also be injected to co-propagate with the signal) and its output power is monitored by a photodetector 214 then processed in a digital signal processor 216 to create a feedback signal to be sent to the phase shifter to lock the interferometer phase thereby actively stabilizing the interferometer. The use of a feedback signal independent of the incoming signal allows the interferometer to be locked if the incoming signal is small or even if it is not present. Note that if an optical amplifier is used before the MZI than the lock signal can be derived from broad band amplifier emission propagating through the MZI.

The design of FIG. 7 is more pump-power efficient than the SLI design of FIG. 3. This is because all the pump power acts to amplify the signal in the high gain arm. However, the SLI design is naturally phase-stable which may make it preferable in some applications.

Figure 8:
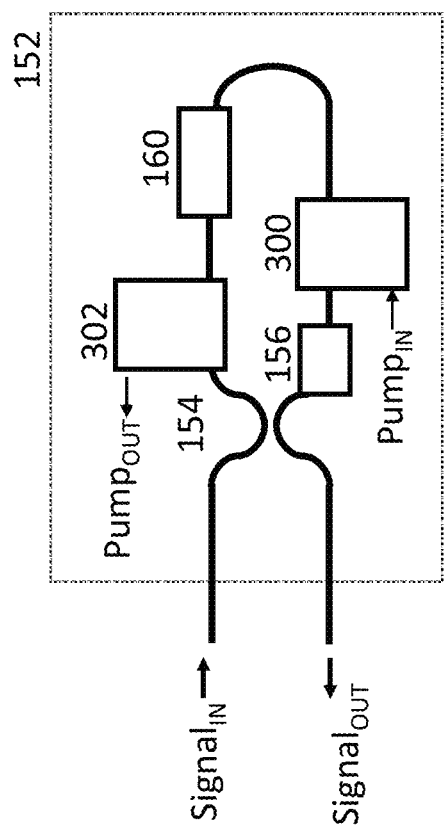
FIG. 8 Narrowband pump SLI BG-IN using wavelength selective combiners.

FIG. 8 shows a SLI embodiment is more pump power efficient than the design of FIG. 3. In FIG. 8 a first wavelength selective coupler 300 couples the pump into the nonlinear fiber such that the pump only propagates in one direction through the fiber (counter clockwise). The wavelength selective coupler combines the pump and signal with low loss at both optical frequencies. A second wavelength selective coupler 302 removes the pump while allowing the signal to propagate through with low loss. This embodiment is more pump power efficient than the design of FIG. 3 in that all the pump power now leads to gain in the high gain direction, maximizing $G_H$, and since there is no pump in the other direction $G_L=1$. The drawback is that the wavelength selective couplers must be of high quality and extinction ratio to separate the closely spaced pump and signal frequencies, which for standard fiber can differ by about 11 GHz. Additionally, unless the wavelength selective couplers are tunable the system will work for only a narrow band of continuous pump frequencies, such as $\pm f_B/4$. This will restrict the ability to tune the bandwidth and it may be difficult to find wavelengths selective couplers with the desired properties. If the wavelengths of operation are fixed or if suitable wavelength combiners and separators exist then the design if FIG. 8 is more efficient.

Figure 9:
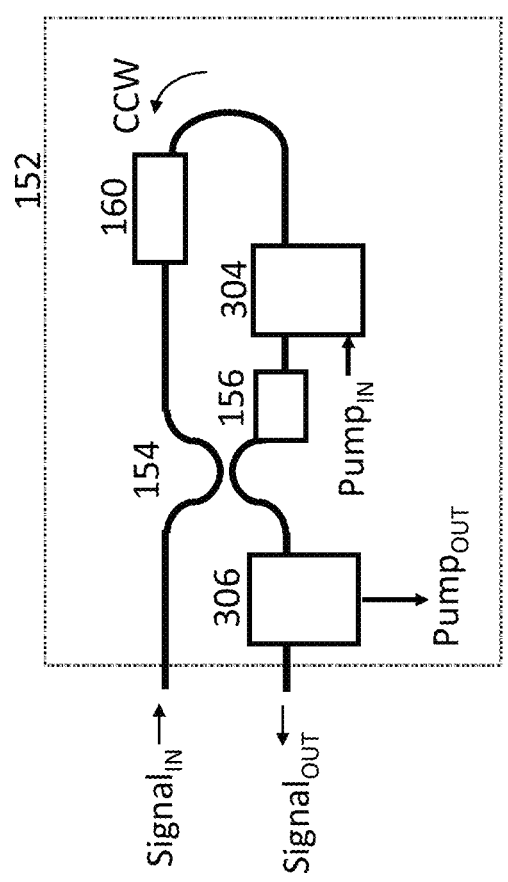
FIG. 9 Wideband pump SLI BG-IN using a broadband combiner and a tunable pump notch filter.

FIG. 9 shows another SLI embodiment where instead of a wavelength selective coupler a broad-band coupler 304 is used to inject the pump in only one direction, in this case the CCW direction, through the nonlinear element. The broad-band coupler can be a 50/50 fused fiber coupler, in which case this design has similar linear insertion loss as the use of a 3 dB attenuator. However, it has the benefit that all the pump power is now propagating in one direction thereby improving pump efficiency. Unlike the input optical signal, the pump now does not enter the SLI input port and thus it is not attenuated by the natural SLI ER. Thus a pump notch filter 306 is inserted at the output to remove the pump wavelength. This notch filter could be based on a circulator followed by a tunable fiber Bragg grating (FBG). The FBG back-reflects a narrow band of light centered at the pump wavelength and the circulator removes the reflected pump so it does not return to the SLI. The FBG filter can be narrow-band (e.g. <10 GHz) and tunable, for instance by tuning the FBG temperature or stretching the FBG. Notching out the pump may be easier in practice to achieve than using wavelength selective couplers or tunable band-pass filters at the signal wavelength and easier to tune to allow for some pump wavelength tuning and thus tuning the central filter wavelength.

Figure 10:
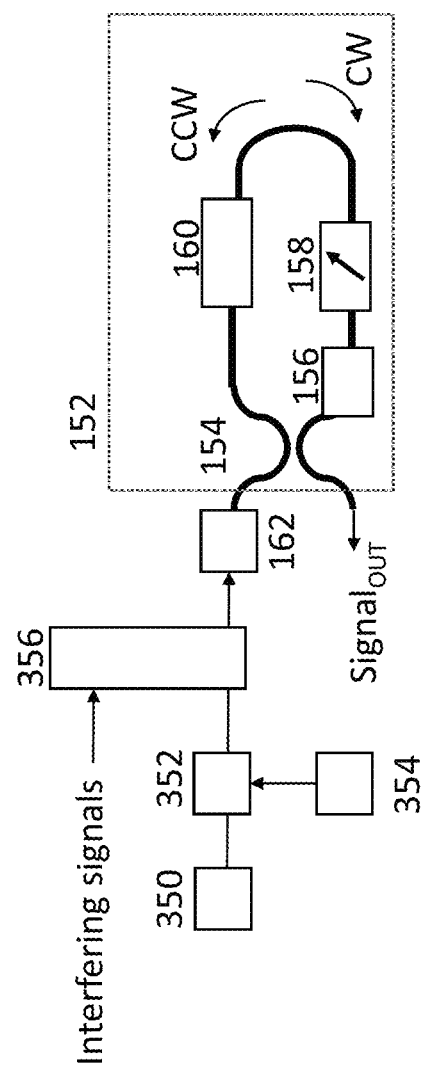
FIG. 10 SLI BG-IN filter system where the pump and signal optical frequency are both derived from the same laser using an external modulator.

FIG. 10 shows an embodiment where the pump and signal are generated from a common master optical signal. Here a master laser 350 at frequency $f_p$ is modulated in an electro-optical (EO) modulator 352 that is driven by an RF oscillator 354 at $f_B$. The output of the EO modulator has frequency tones at $f_p$ and $f_s=f_p-f_B$ (as well as an unimportant tone at $f_p+f_B$). The tone at $f_p$ has a higher optical power than the tone at $f_s$. These tones serve as the pump and signal frequency of the BG-IN. Any unwanted interfering optical signals that may be close to $f_s$ but are separated by at least $\delta f_B$ from $f_s$ can be combined with the pump and signal in an interfering combiner 356, but these unwanted interfering signals will be filtered out and only the optical frequency at $f_s$ will appear at the output. The broad-band emission from the optional optical amplifier 162 will also be filtered out.

Note that $f_B$ is usually not very wavelength dependent, for instance it may change in an optical fiber by 7 MHz per nm or equivalently 7 MHz per 125 GHz of optical frequency change near the wavelength of 1550 nm. This is less than $\delta f_B$ of the fiber so a 125 GHz frequency change of $f_p$ will generate a signal at $f_s=f_p-f_B$ that remains in the gain-bandwidth of the Brillouin gain. Thus, even if the master laser is not frequency stabilized, for instance $f_p$ may fluctuate by ±50 GHz over time, the filtering system will still filter $f_s=f_p-f_B$ within a narrow instantaneous bandwidth of $\delta f_B$ (e.g. 30 MHz). Typical narrow band filters such as high finesse resonators do not share this quality—they would need to be frequency locked to continuously pass an input optical signal of a fluctuating central optical frequency. The Brillouin gain filtering system described is thus well suited for removing interfering signals from unstable optical wavelengths.

The pump and signal frequencies may also be generated from a common master laser using multiple EO modulators. They can alternatively be generated by directly driving the current to a diode laser to generate multiple frequency tones, as is known in the art. In all such cases, the difference between the pump and signal optical frequencies is determined by an RF driving frequency and can thus be very stable and set precisely to $f_B$.

What is claimed is:

1. An apparatus for filtering an input optical signal, comprising:
   an interferometer with an input port and an output port, the input optical signal entering the input port and a filtered input optical signal exiting the output port;
   the interferometer containing a splitter that splits the input optical signal into a high gain arm and a low gain arm and containing a combiner that interferes signals exiting the high and the low gain arms into the output port such that a linearly propagating input optical signal is at an interference null at the output port,
   the high gain arm containing a nonlinear medium having a nonlinear Brillouin gain $G_{hi}$, the Brillouin gain having a Brillouin gain peak being centered around an input optical signal frequency of $f_s$, the low gain arm having a gain of $G_{low}$ at an input optical signal frequency of $f_s$ where $G_{low}<G_{hi}$, the imbalanced gain in the two interferometer arms disrupting the interference null for an input signal frequency of $f_s$, the interferometer thus acting as an optical filter that preferentially passes signals at $f_s$ thereby creating an optical filter.

2. The apparatus of claim 1, wherein the optical filter having an extinction ratio such that the signal transmission at $f_s$ is larger than the signal transmission at $f_s\pm v_B$, where $v_B$ is a Brillouin frequency shift, by an amount larger than $G_{hi}$, thereby realizing a high extinction ratio optical filter without requiring a high Brillouin gain.

3. The apparatus of claim 2, wherein the nonlinear medium is pumped by an optical pump of mean frequency $f_p=f_s+v_B$ and the Brillouin gain being unity for an optical input frequency of $f_s\pm v_B$, the Brillouin gain in the high gain arm being generated by an optical pump that counter-propagates with respect to the signal in the high gain arm, the low gain arm optionally containing a nonlinear medium where the Brillouin gain in the low gain arm is generated by a pump that counter-propagates with respect to the signal in the low gain arm $G_{low}$ at an optical signal frequency of $f_s$.

4. The apparatus of claim 3, wherein the interferometer is in a Sagnac Loop configuration interferometer, where the high gain and low gain arms propagate through the same physical path but with different propagation directions inside the Sagnac Loop, and the interferometer splitter and combiner are the same physical component.

5. The apparatus of claim 4, wherein a signal-pump combiner is located inside the Sagnac Loop, the signal-pump combiner serving to combine the optical pump with the signal propagating in the low gain arm before the nonlinear medium.

6. The apparatus of claim 4, whereas the pump and signal are combined in a pump-signal combiner before the Sagnac Loop, and where a power control device located inside the Sagnac loop attenuates the signal and the pump co-propagating in the high gain arm before the nonlinear medium and attenuates the signal and pump co-propagating in the low gain arm after the nonlinear medium, the power control device thus serving to make the pump power counter-propagating to the signal in the high gain arm larger than the pump power counter-propagating to the signal in the low gain arm thereby leading to $G_{hi}>G_{low}$.

7. The apparatus of claim 6, wherein the pump-signal combiner is a broad band combiner, providing the pump optical frequency to be widely tunable over a range $>v_B$ for purposes of tuning the signal frequency that preferentially passes through the optical filter.

8. The apparatus of claim 6, where the power control device is an optical attenuator with an attenuation level of 1 to 10 dB.

9. The apparatus of claim 1, wherein the nonlinear medium is an optical fiber.

10. The apparatus of claim 1, wherein an interferometer phase is actively stabilized using a locking laser thus allowing the interferometer to stay stabilized regardless of an intensity of the input optical signal.

11. The apparatus of claim 1, wherein the optical pump frequency, when defined over a time of $t_m$ which is an optical propagation time through the nonlinear medium, has an optical bandwidth greater than a Brillouin gain bandwidth $\delta v_B$ of the nonlinear medium, thereby creating a bandwidth of the optical filter greater than $\delta v_B$.

12. The apparatus of claim 1, wherein the input optical signal and the optical pump are generated from the same master optical signal by passing the master optical signal through an optical modulator.

13. The apparatus of claim 1, further comprising an optical amplifier that amplifies the input optical signal prior to the interferometer, the optical amplifier improving the gain and noise parameters of the optical filter while the optical filter serves to remove a broadband noise from the optical amplifier.

14. An apparatus for filtering an optical signal, comprising:
a combiner to combine an input optical signal of optical frequency of $f_s$ with a pump of mean frequency $f_p$, and where $f_p-f_s=f_B$, the combined signal and pump entering a Sagnac loop interferometer (SLI) input port, the SLI containing a nonlinear medium with a Brillouin gain frequency shift of $f_B$, and a Brillouin gain bandwidth of $\delta f_B$, the input optical signal experiencing a net gain of $G_H$ when propagating around the Sagnac loop in the high gain direction and a net gain of $G_L$ when propagating around the Sagnac loop in a low gain direction, where $G_H>G_L$, the SLI output port being at an interference null for the optical signal that linearly propagates through the SLI, whereas input optical signals within the optical frequency band of $f_s\pm\delta f_B/2$ experience a nonlinear Brillouin gain which causes a fraction of the optical signal to exit an SLI output, and whereas a transmittance through the SLI at optical frequency $f_s$ is $T(f_s)$ and a transmittance through the SLI at optical frequency $f_p$ is $T(f_p)$ and $T(f_s)/T(f_p)>G_H$, thereby creating a filter for the input optical signal that has an extinction ratio greater than a highest level of Brillouin gain experienced by the optical signal.

15. The apparatus of claim 14 wherein the nonlinear medium is comprised of optical fiber.

16. The apparatus of claim 14, the SLI containing a power-control device located asymmetrically in the loop so as to force the pump power propagating in the high gain direction to be of a lower intensity than the pump power propagating in the low gain direction, wherein the power-control device is an optical attenuator.

17. The apparatus of claim 14, wherein an optical amplifier is located between the combiner and the SLI, the optical amplifier amplifying both the pump and signal, where the SLI suppresses a broadband amplified spontaneous emission noise out of the optical amplifier thereby achieving a strong signal amplification and low levels of noise.

18. A method for filtering an input optical signal of frequency $f_s$, comprising: passing the input optical signal through an interferometer that is biased to null the signal when an optical pump is not present; amplifying an optical signal propagating through at least one of the arms of the interferometer using a nonlinear Brillouin material having a Brillouin frequency shift of $f_B$, the nonlinear Brillouin material being pumped by an optical pump of mean optical frequency $f_p$ were $f_p-f_s=f_B$, the Brillouin gain in the two arms of the interferometer at frequency $f_s$ being different so as to unbalance the interferometer so that the input optical signal at $f_s$ preferentially passes through the interferometer thereby filtering the input optical signal.

19. The method of claim 18, whereby the interferometer is a Sagnac loop; the pump and the input optical signal being combined in an optical combiner before entering the Sagnac loop, and where a clockwise and a counter-clockwise directions of the Sagnac loop experience different levels of gain because a pump power propagating clockwise through the nonlinear Brillouin material is different than a power propagating counter-clockwise through the nonlinear gain material.

20. The method of claim 18, wherein the input optical signal and the optical pump are generated from a common master optical signal using one or more electro-optic modulators.

* * * * *